(12) United States Patent
Shimada et al.

(10) Patent No.: US 7,619,988 B2
(45) Date of Patent: Nov. 17, 2009

(54) NETWORK CONFIGURATION MANAGEMENT APPARATUS, NETWORK CONFIGURATION MANAGEMENT PROGRAM AND NETWORK CONFIGURATION MANAGEMENT METHOD

(75) Inventors: Kuniaki Shimada, Kawasaki (JP); Yukihiro Watanabe, Kawasaki (JP); Keiichi Oguro, Kawasaki (JP); Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 629 days.

(21) Appl. No.: 11/203,177

(22) Filed: Aug. 15, 2005

(65) Prior Publication Data

US 2006/0171333 A1  Aug. 3, 2006

(30) Foreign Application Priority Data

Feb. 1, 2005  (JP)  ............................. 2005-025200

(51) Int. Cl.
*H04L 12/28* (2006.01)
(52) U.S. Cl. .......................... 370/254; 709/238; 715/734
(58) Field of Classification Search ................. 370/254, 370/242; 715/734, 853; 709/238, 241
See application file for complete search history.

(56) References Cited

U.S. PATENT DOCUMENTS

| | | | | |
|---|---|---|---|---|
| 5,276,789 A * | 1/1994 | Besaw et al. | ................. | 345/440 |
| 5,586,254 A * | 12/1996 | Kondo et al. | ................. | 714/25 |
| 5,831,618 A * | 11/1998 | Fuji et al. | ................. | 715/853 |
| 5,848,243 A * | 12/1998 | Kulkarni et al. | ............. | 709/224 |
| 6,061,723 A * | 5/2000 | Walker et al. | ................. | 709/224 |
| 6,240,068 B1 * | 5/2001 | Dawes | ......................... | 370/252 |
| 2002/0083194 A1 * | 6/2002 | Bak et al. | ................... | 709/238 |
| 2003/0035379 A1 * | 2/2003 | Zimmel et al. | .............. | 370/252 |
| 2005/0278638 A1 * | 12/2005 | Pfahlmann | ................... | 715/734 |
| 2006/0048077 A1 * | 3/2006 | Boyles et al. | ................. | 715/853 |

(Continued)

FOREIGN PATENT DOCUMENTS

JP  03-154536  7/1991

(Continued)

OTHER PUBLICATIONS

Japanese Patent Office Action mailed Nov. 11, 2008 and issued in corresponding Japanese Patent Application No. 2005-025200.

(Continued)

*Primary Examiner*—Dang T Ton
*Assistant Examiner*—Mandish Randhawa
(74) *Attorney, Agent, or Firm*—Staas & Halsey LLP

(57) ABSTRACT

According to this invention, it is possible to display the overall configuration of a network and, at the same time, an important part of the network in detail according to the objective of monitoring so as to be able to grasp/monitor the important part of the network in detail, while globally grasping/monitoring the network configuration, for the purpose of an efficient monitoring operation on the network configuration. A network configuration management apparatus 100 for managing the configuration of a network 101 formed by connecting a plurality of network devices comprises a topology information acquiring section 11 for acquiring topology information on each of the network devices and a degree of importance determining section 12 for computationally determining the degree of importance of each of the network devices, using the topology information acquired by the topology information acquiring section 11. The apparatus 100 displays a network map on the basis of the computationally determined degrees of importance.

6 Claims, 12 Drawing Sheets

U.S. PATENT DOCUMENTS

| | | | |
|---|---|---|---|
| 2006/0101340 A1* | 5/2006 | Sridhar et al. | 715/734 |
| 2006/0126534 A1* | 6/2006 | Huibregtse | 370/254 |
| 2007/0044025 A1* | 2/2007 | Sakamoto | 715/734 |

FOREIGN PATENT DOCUMENTS

| | | |
|---|---|---|
| JP | 9-237236 | 9/1997 |
| JP | 11-313130 | 11/1999 |
| JP | 11-353254 | 12/1999 |

OTHER PUBLICATIONS

Japanese Office Action issued on Feb. 3, 2009 in corresponding Japanese Patent Application 2005-025200.

* cited by examiner

FIG. 2

| | NodeID | 1 | 2 | 3 | 4 | 5 | 6 |
|---|---|---|---|---|---|---|---|
| 21 | HOST NAME | router | fw | switch | svr | svr | pc |
| 22 | DEVICE TYPE | ROUTER | FIREWALL | SWITCH | SERVER | SERVER | PC |
| | DEVICE TYPE (NUMERICAL VALUE) | 4 | 5 | 3 | 2 | 2 | 1 |
| | NUMBER OF CONNECTIONS | 2 | 3 | 2 | 1 | 1 | 1 |
| INTERFACE #1 | IF NAME | eth0 | eth0 | 1 | eth0 | eth0 | eth0 |
| | IP ADDRESS | 172.26.0.10 | 172.23.0.1 | - | 172.25.0.110 | 172.23.0.55 | 172.19.0.100 |
| | MAC ADDRESS | 000729290A01 | 0000E2517BC0 | 0007301FA870 | 0000E2A755A9 | 0000E2A05B91 | 0000E249AE11 |
| | OTHER END OF CONNECTION NodeID | 2 | 5 | 1 | 2 | 2 | 3 |
| INTERFACE #2 | IF NAME | eth1 | eth1 | 2 | | | |
| | IP ADDRESS | 172.19.0.1 | 172.25.0.1 | - | | | |
| | MAC ADDRESS | 000729290A02 | 0007E9117768 | 0007301FA870 | | | |
| | OTHER END OF CONNECTION NodeID | 3 | 4 | 6 | | | |
| INTERFACE #3 | IF NAME | | eth2 | | | | |
| | IP ADDRESS | | 172.26.0.1 | | | | |
| | MAC ADDRESS | | 0007E9117768 | | | | |
| | OTHER END OF CONNECTION NodeID | | 1 | | | | |
| 23 | TRAFFIC RATE | 40 | 25 | 5 | 15 | 10 | 5 |
| 31 | SERVICE TYPE | - | - | - | HTTP,SMTP,POP,SSH | DB,SSH | - |
| | SERVICE TYPE (NUMERICAL VALUE) | 0 | 0 | 0 | 3 | 2 | 0 |
| 32 | NUMBER OF SERVICES | 0 | 0 | 0 | 4 | 2 | 0 |
| 33 | NUMBER OF ACCESSES | 0 | 0 | 0 | 50 | 20 | 0 |

FIG. 4

| NodeID | 1 | 2 | 3 | 4 | 5 | 6 | AVERAGE | STANDARD DEVIATION |
|---|---|---|---|---|---|---|---|---|
| HOST NAME | router | fw | switch | svr | svr | pc | | |
| DEVICE TYPE | ROUTER | FIREWALL | SWITCH | SERVER | SERVER | PC | | |
| DEVICE TYPE (NUMERICAL VALUE) | 4 | 5 | 3 | 2 | 2 | 1 | 2.8333333 | 1.3437096 |
| DEGREE OF IMPORTANCE OF DEVICE TYPE | 2.382721072 | 5.0150909 | 1.1320552 | 0.537851 | 0.537851 | 0.2555385 | | |

FIG. 5

| NodeID | 1 | 2 | 3 | 4 | 5 | 6 | AVERAGE | STANDARD DEVIATION |
|---|---|---|---|---|---|---|---|---|
| HOST NAME | router | fw | switch | svr | svr | pc | | |
| NUMBER OF CONNECTIONS | 2 | 3 | 2 | 1 | 1 | 1 | 1.6666667 | 0.745356 |
| DEGREE OF IMPORTANCE OF NUMBER OF CONNECTIONS | 1.563948316 | 5.9825948 | 1.5639483 | 0.4088417 | 0.4088417 | 0.4088417 | | |

FIG. 6

| NodeID | 1 | 2 | 3 | 4 | 5 | 6 | AVERAGE | STANDARD DEVIATION |
|---|---|---|---|---|---|---|---|---|
| HOST NAME | router | fw | switch | svr | svr | pc | | |
| TRAFFIC RATE | 40 | 25 | 5 | 15 | 10 | 5 | 16.666667 | 12.472191 |
| DEGREE OF IMPORTANCE OF TRAFFIC RATE | 6.493675436 | 1.9506314 | 0.3924232 | 0.8749132 | 0.585949 | 0.3924232 | | |

FIG. 7

| NodeID | 1 | 2 | 3 | 4 | 5 | 6 |
|---|---|---|---|---|---|---|
| HOST NAME | router | fw | switch | svr | svr | pc |
| NODE SIZE | 2.892424691 | 3.8825274 | 0.8856896 | 0.57729 | 0.5050787 | 0.3448171 |

FIG. 9

| NodeID | 1 | 2 | 3 | 4 | 5 | 6 | AVERAGE | STANDARD DEVIATION |
|---|---|---|---|---|---|---|---|---|
| HOST NAME | router | fw | switch | svr | svr | pc | | |
| SERVICE TYPE (NUMERICAL VALUE) | 0 | 0 | 0 | 3 | 2 | 0 | 0.8333333 | 1.2133516 |
| DEGREE OF IMPORTANCE OF SERVICE TYPE | 0.503182264 | 0.5031823 | 0.5031823 | 5.9636776 | 2.6156796 | 0.5031823 | | |

FIG. 10

| NodeID | 1 | 2 | 3 | 4 | 5 | 6 | AVERAGE | STANDARD DEVIATION |
|---|---|---|---|---|---|---|---|---|
| HOST NAME | router | fw | switch | svr | svr | pc | | |
| NUMBER OF SERVICES | 0 | 0 | 0 | 4 | 2 | 0 | 1 | 1.5275252 |
| DEGREE OF IMPORTANCE OF NUMBER OF SERVICES | 0.519621992 | 0.519622 | 0.519622 | 7.1275034 | 1.9244759 | 0.519622 | | |

FIG. 11

| NodeID | 1 | 2 | 3 | 4 | 5 | 6 | AVERAGE | STANDARD DEVIATION |
|---|---|---|---|---|---|---|---|---|
| HOST NAME | router | fw | switch | svr | svr | pc | | |
| NUMBER OF ACCESSES | 0 | 0 | 0 | 50 | 20 | 0 | 11.666667 | 18.6339 |
| DEGREE OF IMPORTANCE OF NUMBER OF ACCESSES | 0.534673481 | 0.5346735 | 0.5346735 | 7.8238952 | 1.5639483 | 0.5346735 | | |

FIG. 12

| NodeID | 1 | 2 | 3 | 4 | 5 | 6 |
|---|---|---|---|---|---|---|
| HOST NAME | router | fw | switch | svr | svr | pc |
| NODE SIZE | 0.518999769 | 0.5189998 | 0.5189998 | 6.928271 | 1.9893284 | 0.5189998 |

FIG. 15

| NodeID | 1 | 2 | 3 | 4 | 5 | 6 | AVERAGE | STANDARD DEVIATION |
|---|---|---|---|---|---|---|---|---|
| HOST NAME | router | fw | switch | svr | svr | pc | | |
| DEVICE TYPE | ROUTER | FIREWALL | SWITCH | SERVER | SERVER | PC | | |
| NUMBER OF LINKS FROM ROUTER | 0 | 1 | 1 | 2 | 2 | 2 | | |
| NUMBER OF LINKS FROM FW | 1 | 0 | 2 | 1 | 1 | 3 | | |
| NUMBER OF LINKS FROM SVR | 2 | 1 | 3 | 2 | 0 | 4 | | |
| SMALLEST VALUE OF THE ABOVE | 0 | 0 | 1 | 1 | 0 | 2 | | |
| DEGREE OF ROUTE RELATION | 1 | 1 | 0.5 | 0.5 | 1 | 0.33333333 | 0.7222222 | 0.2832789 |
| DEGREE OF IMPORTANCE | 2.666003874 | 2.666003874 | 0.456364003 | 0.456364003 | 2.666003874 | 0.253393173 | | |

NETWORK CONFIGURATION MANAGEMENT APPARATUS, NETWORK CONFIGURATION MANAGEMENT PROGRAM AND NETWORK CONFIGURATION MANAGEMENT METHOD

BACKGROUND OF THE INVENTION

1. Field of the Invention

This invention relates to a network configuration management apparatus, network configuration management program and a network configuration management method for managing the configuration of a network that is composed by connecting a plurality of network devices and displaying the configuration on a display screen. A network configuration management apparatus, a network configuration management program and a network configuration management method according to the invention can find applications in the field of maintaining a network and monitoring the services of a network and also failures that can disrupt network communications.

2. Description of the Related Art

Network configuration management apparatus for managing the physical and logical connections of the network devices (routers, servers, switches, PCs and so on) that constitute a network are known. Such apparatus are typically adapted to display the configuration and the running condition of the network on the display screen of a display apparatus such as a monitor as network map.

In the trend of forming large-scale networks in recent years, it is difficult to grasp all the network devices by means of such a network configuration management apparatus if all the network devices are displayed as a single network map on the display screen of a monitor because of the limited display area of the display screen.

For this reason, techniques for dividing the network and displaying a part of the network have been developed. For example, there are known techniques proposed to improve the operating efficiency of the user interface for displaying a network map by displaying partial information relating to the devices that are objects of management by means of the devices out of the information necessary for managing the configuration of the network (see, inter alia, Patent Document 1: Jpn. Pat Appln. Laid-Open Publication No. 9-237236).

With such a technique, map information including information on the symbols to be displayed on the network map and identification information on network maps of lower orders corresponding to each symbol is stored in a map information storage means in advance and a map symbol relocation means retrieves the information on the symbol to be displayed on the network map of a lower order to be deleted from the map information storage means according to a relocation command transmitted from a relocation execution control means and relocates the symbol on a network map of a higher order to reconfigure the network map of the higher order, while deleting the network map of the lower order. Then, a network map display processing means executes a process of displaying a network map that reflects the reconfigured network map.

However, such a technique is based on an idea of dividing a network map and hence does not allow a person to visually recognize the entire network on a single monitor screen. Then, the person cannot grasp/monitor the network configuration globally and efficiently.

SUMMARY OF THE INVENTION

In view of the above-identified problem, it is therefore an object of the present invention to provide a network configuration management apparatus, a network configuration management program and a network configuration management method that can display the overall configuration of a network and, at the same time, an important part of the network in detail according to the objective of monitoring so as to be able to grasp/monitor the important part of the network in detail, while globally grasping/monitoring the network configuration, for the purpose of an efficient monitoring operation on the network configuration.

In an aspect of the present invention, the above object is achieved by providing a network configuration management apparatus for managing the network configuration formed by connecting a plurality of network devices, the apparatus comprising: a topology information acquiring section that acquires topology information on each of the network devices; and a degree of importance determining section that computationally determines the degree of importance of each of the network devices, using the topology information acquired by the topology information acquiring section.

A network configuration management apparatus according to the invention may further comprise: a displaying information quantity computing section that computes the quantity of information for displaying a network map on the basis of the degree of importance as computationally determined by the degree of importance determining section. Furthermore, the apparatus according to the invention may comprise: an importance ratio defining section that defines the importance ratio corresponding to each piece of topology information in a plurality of pieces of topology information, and the displaying information quantity computing section computing the quantity of information to be displayed, using the importance ratio set by the importance ratio defining section.

A network configuration management apparatus according to the invention may further comprise: a degree of importance parameter defining section that emphasizes the correlation of the quantity of information to be displayed as computed by the displaying information quantity computing section for each of the network devices relative to the degree of importance computationally determined by the degree of importance determining section, and the degree of importance determining section computationally determining the degree of importance, using the degree of importance parameter defined by the degree of importance parameter defining section.

A network configuration management apparatus according to the invention may further comprise: a displaying largest area defining section that defines the largest area for displaying a network map on a display section for display the network map, and the displaying information quantity computing section computing the quantity of information to be displayed on the basis of the largest area set by the displaying largest area defining section as well as on the degree of importance computationally determined by the degree of importance determining section.

Further, as the topology information, the types of network devices, the number of connections and the traffic rate can be used. Alternatively, as the topology information, the types of services, the number of services and the number of accesses can be used.

In another aspect of the present invention, there is provided a network configuration management apparatus for managing the network configuration formed by connecting a plurality of network devices, the apparatus comprising: a selecting section that selects two of the network devices; a route acquiring section that acquires the communication route between the two network devices selected by the selecting section; a shortest distance computing section that computes the distances from each of the network devices to each of the network devices on the communication route and acquires the smallest value thereof; a route relation degree determining section that computationally determines the degree of route relation on the basis of the shortest distance computed by the shortest distance computing section; and a degree of importance determining section that computationally determines the degree of importance of each of the network devices computationally determined by the route relation degree determining section.

In still another aspect of the invention, there is provided a medium that has recorded therein, readably by a computer, a network configuration management program for causing a computer to operate for managing the network configuration formed by connecting a plurality of network devices, the program comprising: a topology information acquiring step that acquires topology information on each of the network devices; and a degree of importance determining step that computationally determines the degree of importance of each of the network devices, using the topology information acquired by the topology information acquiring section.

In still another aspect of the invention, there is provided a medium that has recorded therein, readably by a computer, a network configuration management program for causing a computer to operate for managing the network configuration formed by connecting a plurality of network devices, the program comprising: a selecting step that selects two of the network devices; a route acquiring step that acquires the communication route between the two network devices selected in the selecting step; a shortest distance computing step that computes the distances from each of the network devices to each of the network devices on the communication route acquired in the route acquiring step and acquires the smallest value thereof; a route relation degree determining step that computationally determines the degree of route relation on the basis of the shortest distance computed in the shortest distance computing step; and a degree of importance determining step that computationally determines the degree of importance of each of the network devices computationally determined in the route relation degree determining step.

In still another aspect of the present invention, there is provided a network configuration management method of causing a network configuration management apparatus to operate for managing the network configuration formed by connecting a plurality of network devices, the method comprising: a topology information acquiring step that acquires topology information on each of the network devices; and a degree of importance determining step that computationally determines the degree of importance of each of the network devices, using the topology information acquired in the topology information acquiring step.

In a further aspect of the present invention, there is provided a network configuration management method of causing a network configuration management apparatus to operate for managing the network configuration formed by connecting a plurality of network devices, the method comprising: a selecting step that selects two of the network devices; a route acquiring step that acquires the communication route between the two network devices selected in the selecting step; a shortest distance computing step that computes the distances from each of the network devices to each of the network devices on the communication route acquired in the route acquiring step and acquires the smallest value thereof; a route relation degree determining step that computationally determines the degree of route relation on the basis of the shortest distance computed in the shortest distance computing step; and a degree of importance determining step that computationally determines the degree of importance of each of the network devices computationally determined in the route relation degree determining step.

Thus, according to the invention, it is possible to display the overall configuration of a network and, at the same time, an important part of the network in detail according to the objective of monitoring so as to be able to grasp/monitor the important part of the network in detail, while globally grasping/monitoring the network configuration, for the purpose of an efficient monitoring operation on the network configuration.

BRIEF DESCRIPTION OF THE DRAWINGS

FIG. 2 is a table showing the topology information stored in the topology information database;

FIG. 4 is a table showing the computationally determined values of the degrees importance in terms of the type of device;

FIG. 5 is a table showing the computationally determined values of the degrees of importance in terms of the number of connections of device;

FIG. 6 is a table showing the computationally determined values of the degrees of importance in terms of the traffic rate of device;

FIG. 7 is a table illustrating the outcome of computations on the sizes of nodes for a network maintenance view;

FIG. 9 is a table showing the computationally determined values of the degrees of importance in terms of the type of service;

FIG. 10 is a table showing the computationally determined values of the degrees of importance in terms of the number of services;

FIG. 11 is a table showing the computationally determined values of the degrees of importance in terms of the number of accesses;

FIG. 12 is a table showing the outcome of computations on the sizes of the nodes in a network service monitoring view;

FIG. 15 is a table showing the computationally determined values of the degrees of importance of the third embodiment.

DETAILED DESCRIPTION OF THE PREFERRED EMBODIMENTS

Now, the present invention will be described by referring to the accompanying drawings that illustrate preferred embodiments of the invention.

First Embodiment

Figure 1:
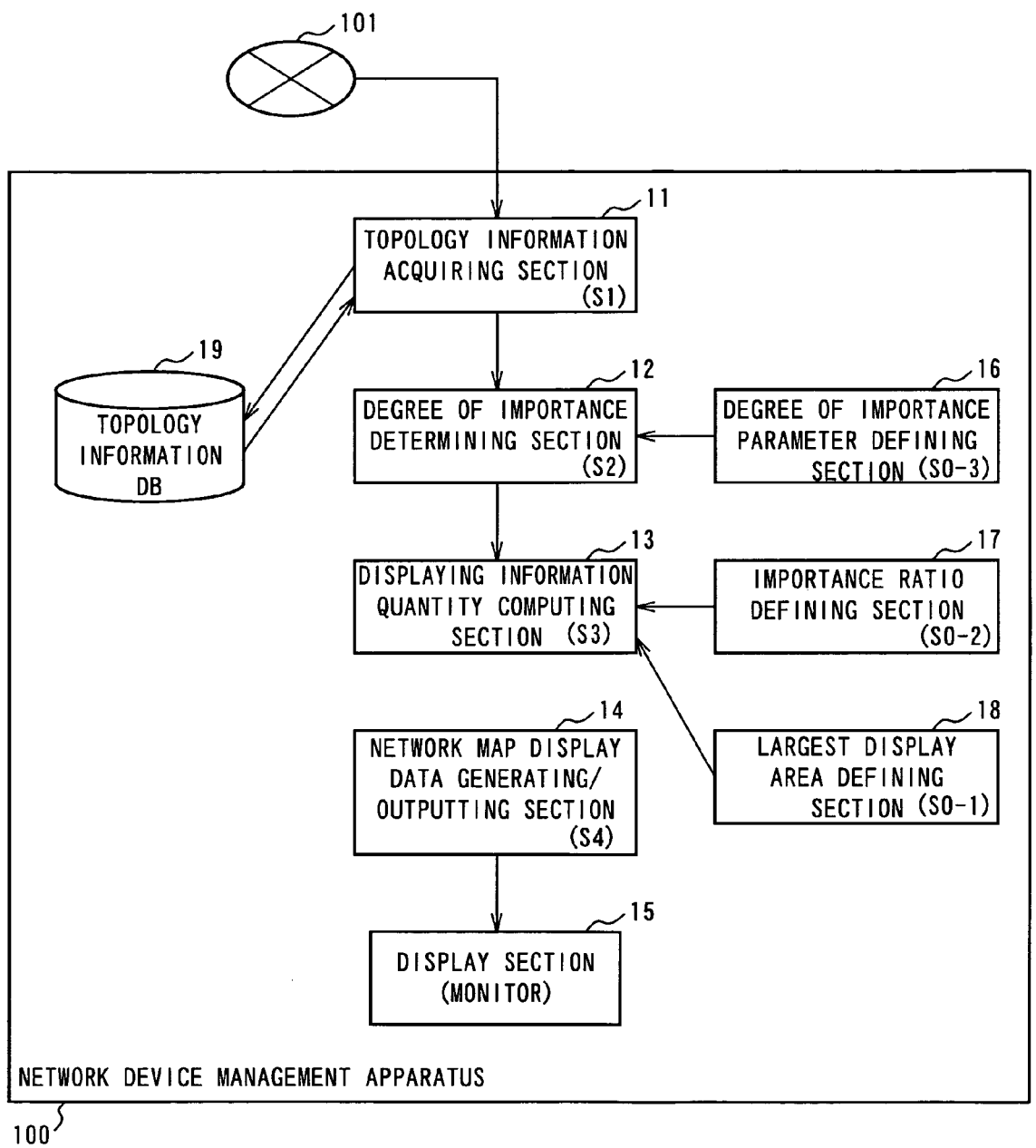
FIG. 1 is a schematic block diagram of a first embodiment according to the present invention, illustrating the configuration and the operation thereof.

FIG. 1 is a schematic block diagram of a first embodiment according to the present invention, illustrating the configuration and the operation thereof.

The network configuration management apparatus 100 of the first embodiment comprises a topology information acquiring section 11 for acquiring topology information on the configuration of the network 101 and a degree of importance determining section 12 for computationally determining the degree of importance of each of the network devices on the basis of the topology information acquired by the topology information acquiring section 11, a displaying information quantity computing section 13 for computing the quantity of information to be displayed on the basis of the degrees of importance computationally determined by the degree of importance determining section 12, a display data generating/outputting section 14 for generating displaying data for displaying a network map on the basis of the quantity of information to be displayed as computed by the displaying information quantity computing section 13 and a display section (monitor) 15 for displaying the displaying data generated by the display data generating/outputting section 14.

The network configuration management apparatus 100 additionally comprises a degree of importance parameter defining section 16 adapted to define a degree of importance parameter that can be used appropriately when the degree of importance determining section 12 computationally determines the degree of importance, an importance ratio defining section 17 adapted to define an appropriate importance ratio when the displaying information quantity computing section 13 computes the quantity of information to be displayed and a largest display area defining section 18 adapted to define the largest display area of the display section 15. The network configuration management apparatus 100 additionally comprises a topology information database (DB) 19 adapted to store the topology information acquired by the topology information acquiring section 11 that can be referred to appropriately.

Now, the operation of the first embodiment will be described below.

Figure 3:
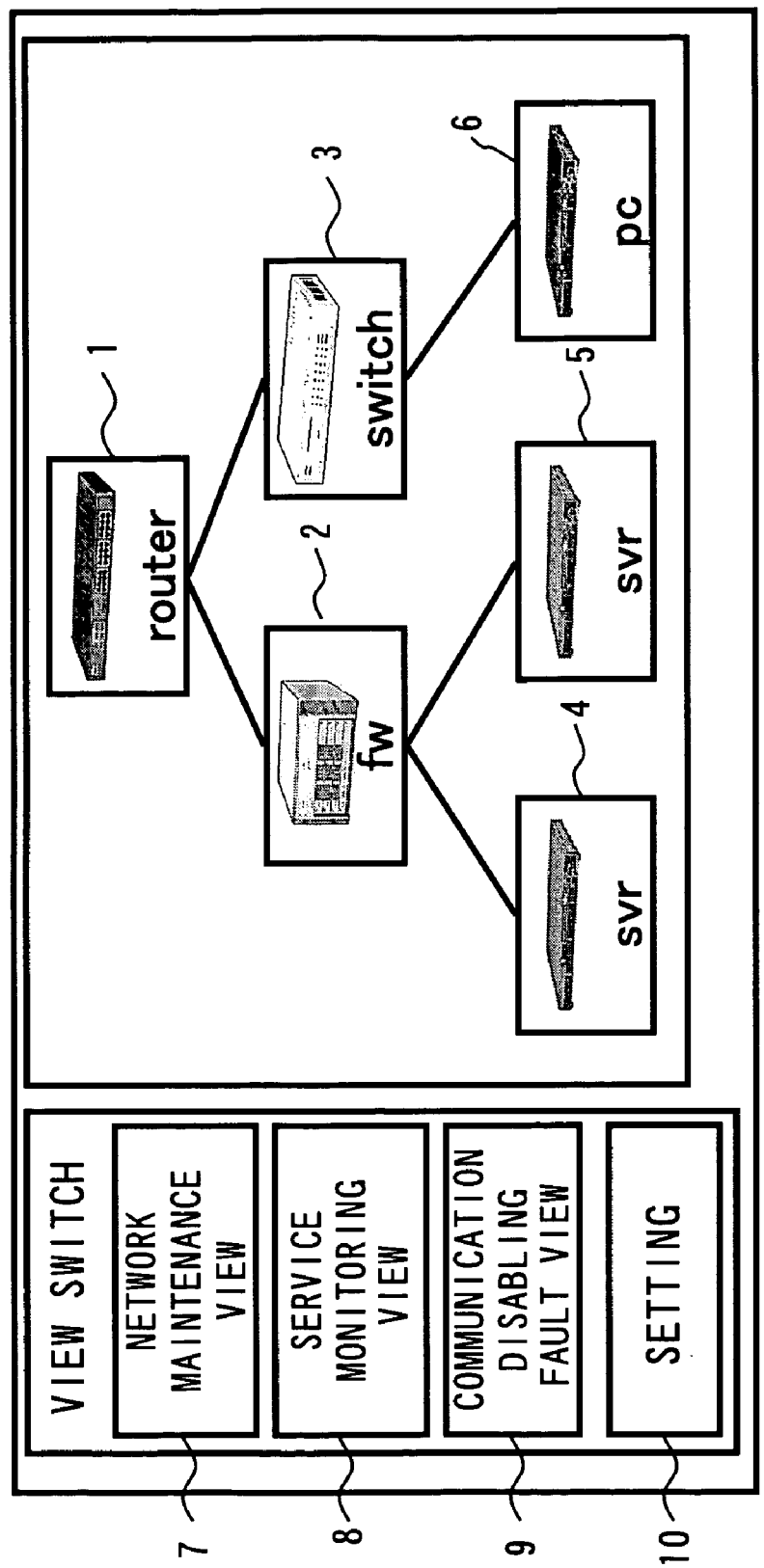
FIG. 3 is an image displayed on the monitor screen, showing a standardized view of the network synthesis.

The topology information acquiring section 11 is adapted to be connected to the network 101 and acquires topology information from each of the network devices that form the network 101. The acquired topology information is temporarily stored in the topology information database 19. FIG. 2 is a table illustrating the topology information stored in the topology information database 19. FIG. 3 is an image displayed on the monitor screen of the display section 15, showing a standardized view. It shows the network configuration contained in the topology information in FIG. 2.

In this embodiment of network configuration in which a plurality of network devices are connected, a firewall 2 and a switch 3 are connected to a router 1 and a server 4 and another server 5 are connected to the firewall 2, while a PC 6 is connected to the switch 3. The symbols indicating the respective network devices (nodes) are used as node IDs in the following description.

The image (standard view) being displayed on the monitor screen of the display section 15 as shown in FIG. 3 may be switched to a network maintenance view, a service monitoring view or a communication disabling fault view. Any of these views can be selected by depressing the corresponding one of the view selection buttons 7 through 9 and the setting button 10 in FIG. 3. In the following description of the first embodiment, it is assumed that the network maintenance view button 7 is depressed/selected so as to use the network configuration management apparatus 100 for the purpose of maintenance of the network. In the following steps described below are those of the operation of the network configuration management apparatus of this invention. (Sn) (n=1, 2, ... ) in FIG. 1 indicate the sections that are principally responsible for the operations of the respective steps.

(Step S1: Acquisition of Topology Information)

To compose a network maintenance view of this embodiment, the network configuration management apparatus 100 computationally determines the degree of importance of each of the network devices, using the type of the network device 21, the number of connections of the device 22 and the traffic rate 23 as topology information. In other words, the topology information acquiring section 11 acquires the above values from the topology information database 19 and delivers them to the degree of importance determining section 12 (the topology information acquiring section 11 may be so adapted as to acquire the values directly from each of the devices by way of the network 101 without using the topology information database 19).

(Step S2: Computationally Determining the Degree of Importance)

(Step S2-1: Computation of the Degree of Importance of Each Type of Device)

Firstly, the network configuration management apparatus 100 acquires the predetermined value of each type of device from the topology information table (Step S2-1-1). Alternatively, the network configuration management apparatus 100 may acquire the value by referring to the conversion table shown below at each computing operation on the basis of the type of device.

firewall: 5
router: 4
switch: 3
server: 2
PC: 1

Note that the above conversion table is simply an example prepared on a policy that firewalls and routers have a high degree of importance and switches and servers have a medium degree of importance, whereas PC have only a low degree of importance and the present invention is by no means limited thereto.

Then, the network configuration management apparatus 100 computes the average μ and the standard deviation σ of all the nodes (devices) (Step S2-1-2).

When the six nodes shown on the table of FIG. 2 are used for the computation, μ=2.83 and σ=1.34.

The degree of importance of the type of device is expressed by imp_x, where x represents the type (a numerical value) of a device (node) and the degree of importance imp_x of each type of device is defined by the formula below. The network configuration management apparatus 100 determines the degree of importance imp_x by computation (Step S2-1-3).

$$\mathit{imp\_x} = \exp\{k(x-\mu)/\sigma\}$$

k in the above formula represents an degree of importance parameter. Assume k=1 here for computations. FIG. 4 shows the values obtained by the computations. More specifically, FIG. 4 shows the node (device) IDs, the host names, the types of devices, the values corresponding to the respective types of devices and the degrees of importance of the types of devices.

(Step S2-2: Computation of the Degree of Importance of the Number of Connections)

Then, the degree of importance of the number of connections is computed by using a similar formula (imp_y).

In the above formula, y represents the number of connections. FIG. 5 is a table showing the computationally determined values of degree of importance in terms of the number of connections of device. Note that connections as used herein include not only physical connections but also logical connections.

(Step S2-3: Computation of the Degree of Importance of the Traffic Rate)

Then, the degree of importance of the traffic rate is computed by using a similar formula (imp_z).

In the above formula, z represents the traffic rate. FIG. 6 is a table showing the computationally determined values of the degree of importance in terms of the traffic rate.

(Step S3: Computation of the Quantity of Information to be Displayed for Each Node)

If the size of a node is s, the quantity of information to be displayed for each node is expressed by the formula below.

$$s=((imp\_x\char`^\alpha)\times(imp\_y\char`^\beta)\times(imp\_z\char`^\gamma))\char`^(1/3)$$

In the above formula, $\alpha$, $\beta$ and $\gamma$ are ratios defined by the user. However, as for the size (the display area), the largest area (s_max) is defined by the user and the requirement of $$\Sigma s \leq s\_max$$

has to be met. If the above requirement is not met, each s is recomputed in a manner as defined below.

$$s \leftarrow s \times s\_max/\Sigma s$$

After computing each node, sizes for display of the network devices (nodes) are obtained as numerical values shown in FIG. 7.

(Step S4: Displaying a Network Map)

The network map display data generating/outputting section 14 creates the data to be used for display by using the values obtained by the computation for the quantity of information to be displayed for each node in Step S3. For example, the network map display data generating/outputting section 14 prepares data so as to make the display area of each device (node) equal to a multiple of the listed value and outputs it to the monitor. Then, as a result, it is possible to display the network and the devices, each of which is emphasized as a function of the degree of importance in the network configuration as shown in FIG. 8.

Figure 8:
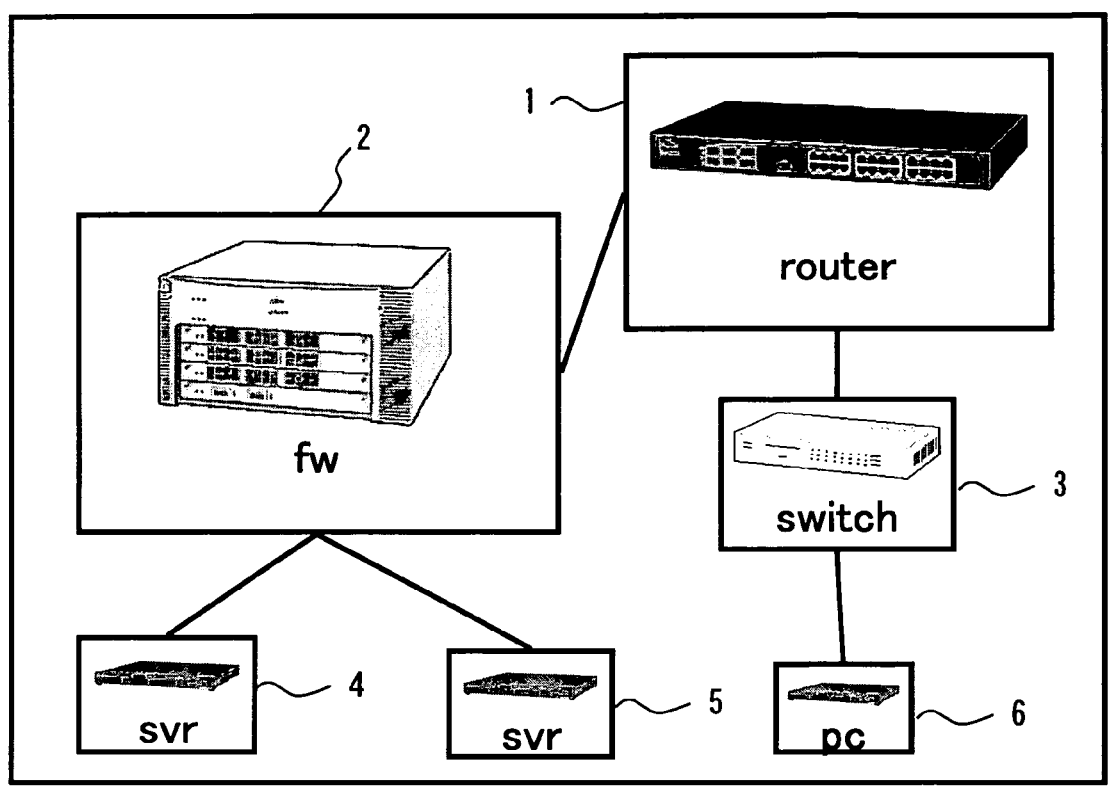
FIG. 8 is an image displayed on the monitor screen, showing a network maintenance view.

As shown in FIG. 8, the firewall 2, the router 1, the switch 3, the server 4, the server 5 and the PC 6 have respective display areas that reflect their degrees of importance that are computationally determined. The firewall 2 that shows the highest degree of importance has the largest display area and is followed by the router 1. The display areas decrease in the above listed order. With this arrangement, the user can grasp the overall network configuration by means of a single image on the monitor screen and monitor the network by referring to the degrees of importance of the devices that are reflected to the display areas in the image.

While the display areas of the network devices are made to reflect the respective degrees of importance of the devices in this embodiment, they may alternatively be made to reflect the degrees of detailedness of pieces of information on the devices respectively, such as the lengths of connection, the diametrical sizes of connection, the IP addresses or the like, in relation to the degree of importance.

(Step of Defining Various Set Values)

Additionally, if necessary, the steps of defining various set values including the above-described ones (the largest display area (s_max), the importance ratio ($\alpha$, $\beta$, $\gamma$), degree of importance parameter (k)) to be used for the computations of determining the degrees of importance and the quantities of information to be displayed are conducted appropriately. Each of the set values may be defined collectively in advance or each value necessary for the computations may be defined whenever necessary.

The above described largest display area (s_max) is defined in terms of the ratio of the area to be used for displaying all the nodes (devices) relative to the entire display area of the monitor screen when displaying the network configuration on the monitor screen (Step S0-1). This computation is carried out by the largest display area defining section 18 according to the corresponding user operation. Thus, the ratio (%) of the display area to be used for displaying the nodes relative to the largest display area (s_max) is defined in this step.

The importance ratio ($\alpha$, $\beta$, $\gamma$) is defined for each type of device, the number of connections thereof and each of a plurality of pieces of topology information (Step S0-2). The importance ratio is defined by the importance ratio defining section 17 according to the corresponding user operation so as to meet the following conditional formula. The importance ratio represents the ratio to which the type of device, the number of connections and the traffic rate is regarded as important.

$$\alpha+\beta+\gamma=3,$$

where $\alpha$: ratio of the type of device, $\beta$; ratio of the number of connections and $\gamma$; ratio of the traffic rate.

Note that $\alpha=1$, $\beta=1$ and $\gamma=1$ are defined as default values.

Additionally, the degree of importance parameter (k) is defined to emphasize the correlation of the display area relative to the degree of importance (Step S0-3). The degree of importance parameter (k) is defined by the degree of importance parameter defining section 16 according to the corresponding user operation. When the degree of importance parameter is made to show a large value, the size difference among the nodes is emphasized.

Second Embodiment

The first embodiment is described above in terms of displaying a network maintenance view. Now, a second embodiment will be described below in terms of displaying a network service monitoring view. More specifically, in the following description of the second embodiment, it is assumed that a service monitoring view button 8 in FIG. 3 is depressed/selected so as to use the network configuration management apparatus 100 for the purpose of monitoring services.

In the second embodiment, the types of service 31, the number of services 32 and the number of accesses 33 of each of the network devices are used as topology information. FIGS. 9 through 11 show the computationally determined values of the degrees of importance in terms of the above items. The configuration of the management apparatus of the second embodiment is identical with the one illustrated in FIG. 1.

For the types of service, the following conversion table is used.

HTTP, SMTP, POP, DNS: 3

DB, business application: 2

SSH, Ftp, telnet 1

Note that the above conversion table is simply an example prepared on a policy that the types of service of HTTP, SMTP, POP and DNS show a high degree of importance and those of DB and business application show a medium degree of importance, whereas those of SSH, FTP and telnet have a small degree of importance and the present invention is by no means limited thereto. As for the number of services, a device that is not providing any service takes a value of 0, while a device that is providing two or more than two services takes a high value.

For the operation of the second embodiment, formulas similar to those of the first embodiment are used. Values that correspond to respective types of service are acquired as variable x as described above for the first embodiment. The numbers of services are used as variable y as described above for the first embodiment, while the numbers of accesses are used as variable z also as described above for the first embodiment.

Figure 13:
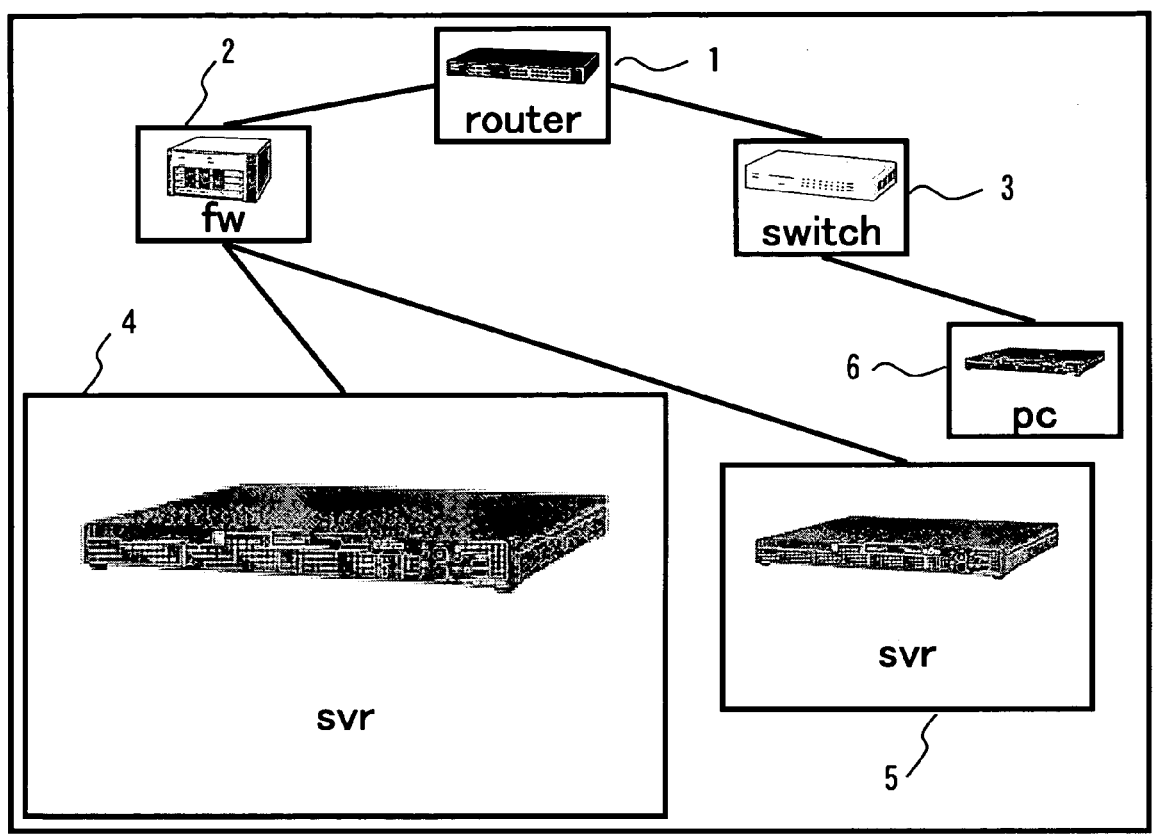
FIG. 13 is an image displayed on the monitor screen, showing a network service monitoring view.

FIG. 12 is a table showing the outcome of computations on the sizes of the network devices (nodes). FIG. 13 shows a network service monitoring view obtained as a result of the computations.

While the size of each network device being displayed may be altered according to the degree of importance thereof in the second embodiment, it may alternatively be so arranged that information on the network device may be displayed with an altered degree of detailedness along with the alteration of the size of the device when the degree of importance of the device is altered.

Third Embodiment

Now, a third embodiment according to the present invention will be described below in terms of displaying a communication disabling fault view.

More specifically, in the following description of the third embodiment, it is assumed that a communication disabling fault view button 9 in FIG. 3 is depressed/selected so as to use the network configuration management apparatus for the purpose of monitoring communication faults.

Figure 14:
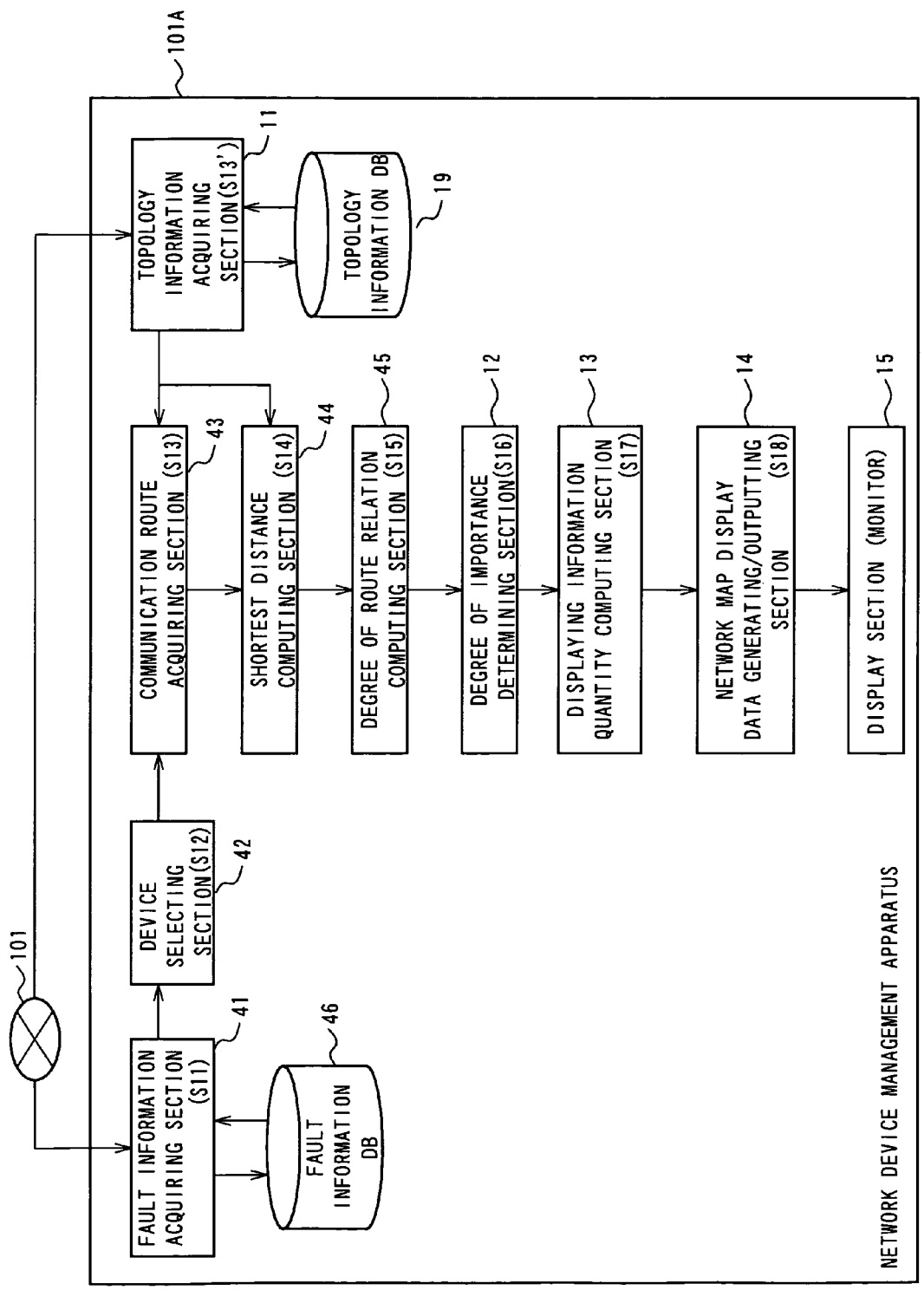
FIG. 14 is a schematic block diagram of a third embodiment according to the present invention, showing the configuration and the operation thereof.

FIG. 14 is a schematic block diagram of the third embodiment, showing the configuration and the operation thereof.

A network configuration management apparatus 100A of the third embodiment comprises, in addition to the components illustrated in FIG. 1, a fault information acquiring section 41, a device (node) selecting section 42, a communication route acquiring section 43, a shortest distance computing section 44 and a degree of route relation computing section 45, the outcome of the operation of the degree of route relation computing section 45 is output to the degree of importance determining section 12. The apparatus 100A additionally comprises a fault information database 46 for storing fault information acquired by the fault information acquiring section 41. The configuration from the topology information acquiring section 11 down to the topology information database 19 of the third embodiment is identical with that of the first embodiment described earlier by referring to FIG. 1 and hence will not be described here any further. Note that the defining sections 16 through 18 are omitted from FIG. 14.

Now, the operation will be described by referring to FIG. 14.

(Step S11: Acquisition of Fault Information)

The fault information acquiring section 41 acquires fault information from the network 101 or the fault information database 46 and delivers it to the device selecting section 42.

(Step S12: Selection of Devices (Node) Between Two Points)

The device selecting section 42 selects two devices (nodes) that define the longest distance in which communication is disabled and delivers them to the communication route acquiring section 43.

It is assumed in the description of this embodiment that router 1 and svr 5 are selected.

(Step S13: Acquisition of a Communication Route)

The communication route acquiring section 43 computationally determines the communication route between the two nodes and acquires it. In the case of this embodiment, it becomes clear that the communication route is defined by the router 1-fw 2-the svr 5. The communication route acquiring section 43 delivers this information to the shortest distance computing section 44. The topology information acquired by the topology information acquiring section 11 in Step S13' is used appropriately in the operation of computationally determining the communication route and that of computationally determining the shortest distance.

(Step S14: Computation of the Shortest Distance)

The shortest distance computing section 44 computes the distance (the number of links) from each of the nodes on the communication route to each of the nodes and selects the smallest value of the computed distances as m. Then, it delivers the smallest value m to the degree of route relation computing section 45.

(Step S15: Computation of the Degree of Route Relation)

Then, the degree of route relation computing section 45 computes the degree of route relation X, using m acquired from the shortest distance computing section 44 and the formula shown below. Then, it delivers the degree of route relation X to the degree of importance determining section 12.

$$X=1/(1+m)$$

(Step S16: Computation of the Degree of Importance)

The degree of importance determining section 12 computationally determines the degree of importance imp, using X and the formula shown below. In the formula below, the values of k, $\mu$ and $\sigma$ are the same as those of the first embodiment.

$$imp=\exp\{k(X-\mu)/\sigma\}$$

(Step S17: Computation of the Quantity of Information to be Displayed)

The displaying information quantity computing section 13 computes the quantity of information to be displayed on the basis of the degree of importance obtained by the degree of importance computing section 12. Note that the size s of a node is typically expressed by a multiple of the degree of importance that is confined within a range that does not exceed the largest display area.

(Step S18: Display of a Network Map)

The network map display data generating/outputting section 14 prepares the data to be displayed on the monitor screen, using the values obtained as a result of the computations in Step S17 for determining the quantity of information to be displayed.

Figure 16:
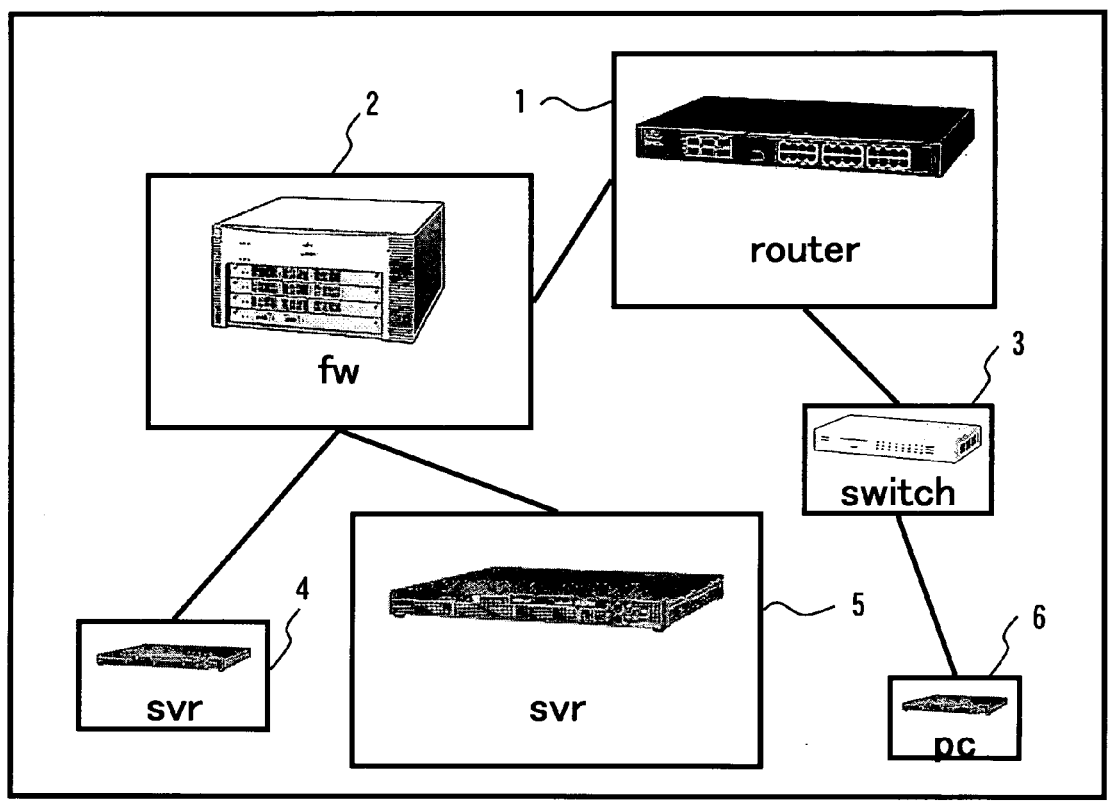
FIG. 16 is an image displayed on the monitor screen, showing a communication disabling fault view.

FIG. 15 is a table showing the values obtained as a result of the above-described computations. FIG. 16 is an image displayed on the monitor screen, showing the result thereof.

While the size of each network device being displayed may be altered according to the degree of importance thereof in the third embodiment, it may alternatively be so arranged that information on the network device may be displayed with an altered degree of detailedness along with the alteration of the size of the device when the degree of importance of the device is altered as in the first and second embodiments.

With any of the above-described embodiments of the present invention, it is possible to prepare a network configuration management program according to the invention by means of the program for executing the operations of the steps described above in detail by referring to FIGS. 1 and 14. The prepared program is stored in a computer-readable storage medium by a computer so as to become computer-executable. Computer-readable recording mediums that can be used for the purpose of the present invention include portable storage mediums such as CD-ROMS, flexible disks, DVDs, magneto optical disks and IC cards as well as databases adapted to hold computer programs, other computers and their databases.

What is claimed is:

1. A network configuration management apparatus, comprising:
   a selecting section that selects two of a plurality of network devices which are connected to a network;
   a route acquiring section that acquires a communication route between the two network devices selected by the selecting section;
   a shortest distance computing section that computes a number of links from each of the network devices to each of the other network devices on the communication route, to determine a smallest value of the number of links for each of the network devices;
   a route relation degree determining section that determines a degree of route relation for each of the network devices as $X=1/(1+m)$ where X is the degree of route relation and m is the smallest value of the number of links; and
   a degree of importance determining section that determines a degree of importance of each of the network devices as $imp=\exp\{k(X-\mu)/\sigma\}$ where imp is the degree importance, k is a degree of importance parameter, $\mu$ is an average of the degree of route relation for the network devices, and $\sigma$ is a standard deviation of the degree of route relation for the network devices.

2. The apparatus according to claim 1, further comprising:
   a displaying information quantity computing section that computes a quantity of information for displaying a network map based on the degree of importance.

3. A computer readable medium storing a network configuration management program for causing a computer to execute a process comprising:
   selecting two of a plurality of network devices which are connected to a network;
   acquiring a communication route between the two network devices selected in the selecting;
   computing the number of links from each of the network devices to each of the other network devices on the communication route, to determine a smallest value of the number of links for each of the network devices;
   determining a degree of route relation for each of the network devices as $X==1/(1+m)$ where X is the degree of route relation and m is the smallest value of the number of links; and
   determining a degree of importance of each of the network devices as $imp=\exp\{k(X-\mu)/\sigma\}$ where imp is the degree importance, k is a degree of importance parameter, $\mu$ is an average of the degree of route relation for the network devices, and $\sigma$ is a standard deviation of the degree of route relation for the network devices.

4. The computer readable medium according to claim 3, the process further comprising:
   computing a quantity of information for displaying a network map based on the degree of importance.

5. The computer readable medium according to claim 4, the process further comprising:
   displaying a network map based on the quantity of information.

6. A network configuration management method of causing a network configuration management apparatus to operate for managing a network configuration formed by connecting a plurality of network devices, the method comprising:
   selecting two of the network devices;
   acquiring a communication route between the two network devices selected in the selecting;
   computing a number of links from each of the network devices to each of the network devices on the communication route acquired in the acquiring, to determine a smallest value of the number of links for each of the network devices;
   determining a degree of route relation for each of the network devices as $X=1/(1+m)$ where X is the degree of route relation, and m is the smallest value of the number of links; and
   determining a degree of importance of each of the network devices as $imp=\exp\{k(X-\mu)\sigma\}$ where imp is the degree importance, k is a degree of importance parameter, $\mu$ is an average of the degree of route relation for the network devices, and $\sigma$ is a standard deviation of the degree of route relation for the network devices.

* * * * *

UNITED STATES PATENT AND TRADEMARK OFFICE
CERTIFICATE OF CORRECTION

PATENT NO. : 7,619,988 B2
APPLICATION NO. : 11/203177
DATED : November 17, 2009
INVENTOR(S) : Kuniaki Shimada et al.

Page 1 of 1

It is certified that error appears in the above-identified patent and that said Letters Patent is hereby corrected as shown below:

Column 12, Line 9, change "X= =1/(1+m)" to --X=1/(1+m)--.

Signed and Sealed this

Sixteenth Day of February, 2010

David J. Kappos
*Director of the United States Patent and Trademark Office*